No. 698,157. Patented Apr. 22, 1902.
J. E. THORNTON.
PHOTOGRAPHIC FILM ROLL AND ROLL HOLDER.
(Application filed Mar. 20, 1900.)
(No Model.) 2 Sheets—Sheet 1.
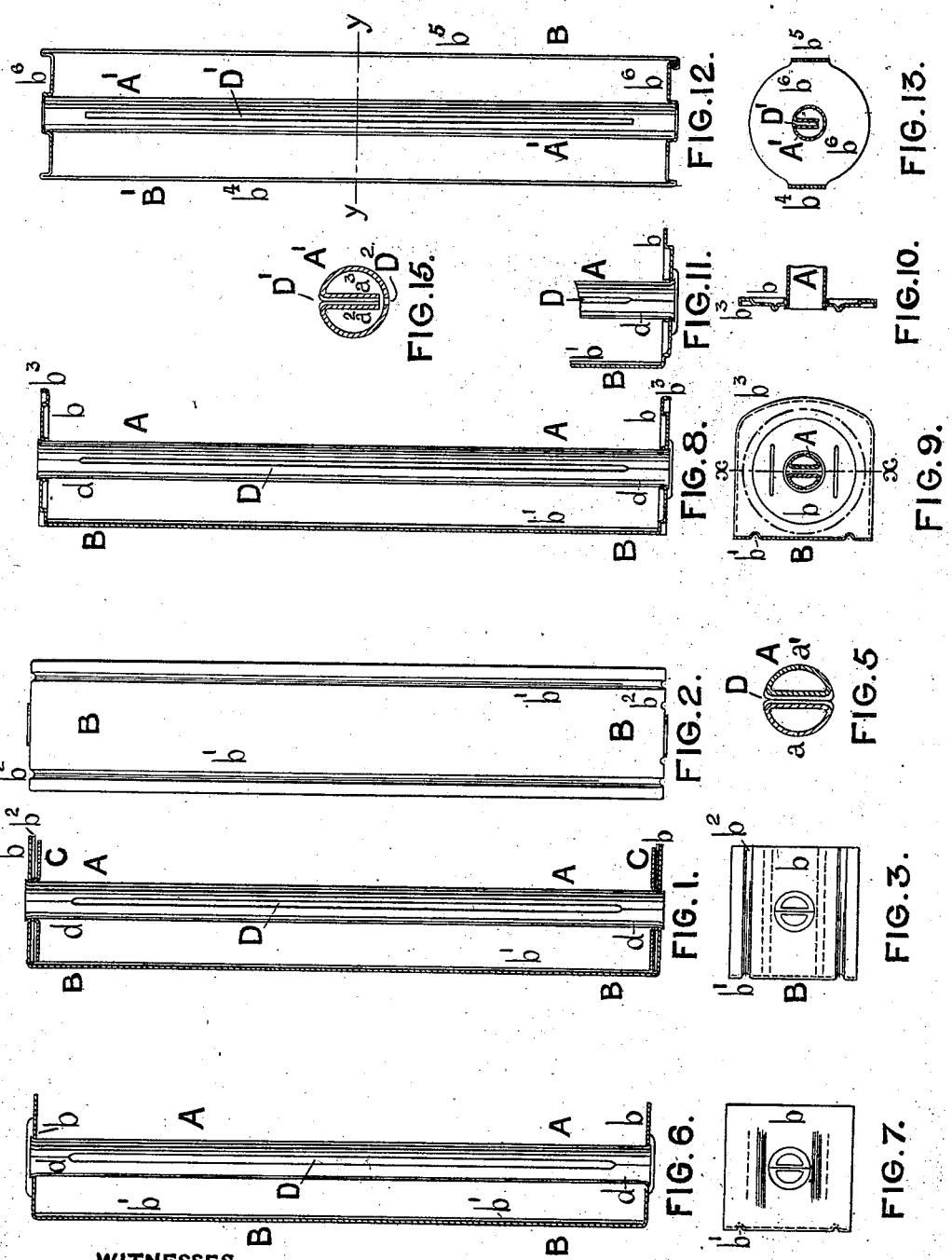
WITNESSES. INVENTOR.

No. 698,157. Patented Apr. 22, 1902.
J. E. THORNTON.
PHOTOGRAPHIC FILM ROLL AND ROLL HOLDER.
(Application filed Mar. 20, 1900.)
(No Model.) 2 Sheets—Sheet 2.

WITNESSES.
Joseph Bates.
Alfred Davies

INVENTOR.
J. E. Thornton
by D. Owen O'Brien
atty.

UNITED STATES PATENT OFFICE.

JOHN E. THORNTON, OF MANCHESTER, ENGLAND.

PHOTOGRAPHIC-FILM ROLL AND ROLL-HOLDER.

SPECIFICATION forming part of Letters Patent No. 698,157, dated April 22, 1902.

Application filed March 20, 1900. Serial No. 9,466. (No model.)

*To all whom it may concern:*

Be it known that I, JOHN EDWARD THORNTON, a British subject, residing at Manchester, in the county of Lancaster, England, have invented certain new and useful Improvements in Photographic-Film Rolls and Roll-Holders, of which the following is a specification.

This invention is designed to provide a spool or reel for carrying the photographic films employed in cameras made from sheet metal in lieu of the wooden spool or reel hitherto used for the purpose.

I now make the spool or reel from sheet metal suitably shaped, either bent, spun, or jointed up.

The invention will be fully described with reference to the accompanying drawings.

Figure 4:
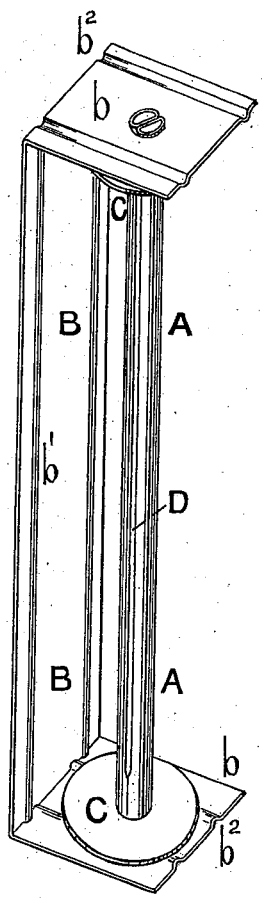
Figure 14:
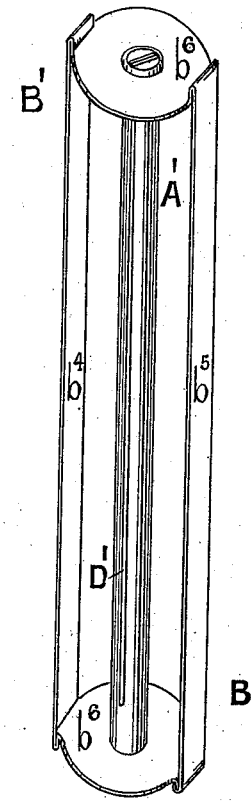

Figure 1 is a side elevation, partly in section, of the spool or reel A and holder B, in which it rotates. Fig. 2 is an elevation from the back, showing the holder B; Fig. 3, an end elevation of Fig. 1. Fig. 4 is a perspective view of the same spool or reel A and holder B as in Fig. 1. Fig. 5 is a transverse section, enlarged, through the reel A. Fig. 6 is a side elevation, partly in section, of spool or reel A and holder B, showing a modification. Fig. 7 is an end elevation of Fig. 6. Fig. 8 is a side elevation, partly in section, showing another modification. Fig. 9 is an end elevation of Fig. 8. Fig. 10 is a longitudinal section on line X X, Fig. 9. Fig. 11 is a part side elevation, partly in section, showing another modification. Fig. 12 is a side elevation showing a further modification. Fig. 13 is a sectional plan of same on line Y Y, Fig. 12. Fig. 14 is a perspective view of the same spool or reel and holder as that shown in Fig. 12; Fig. 15, transverse section, enlarged, showing modified formation of the spool or reel.

The reel or spool A is preferably made, as shown in Fig. 5, from two pieces of sheet metal bent to D shape and attached together to make a cylindrical tube. The D-shaped pieces are bent with two flat inner sides, the edges or joints of the metal being placed at the outsides $a\ a'$. In order to form the slit or slot D the length of the spool through which to pass the end of the film, both ends at $d$ are enlarged or otherwise the center part is indented, so that when the two parts are brought together the slit D is formed between them.

In the modification shown in Fig. 15 the spool A' is made from a single piece of sheet metal bent to the shape shown in Fig. 15, with the two edges $a^2\ a^3$ turned into the interior and left sufficiently far apart to form the slot or slit D' between them. The slit $D^2$ at the opposite side is formed by a saw cut out which does not sever the ends $d'$.

The slot D or D' (shown in either of the Figs. 5 or 15) is constructed with internal walls $d$, which serve as guides for the film-paper passing through from side to side, so that the paper or film can be threaded through easily without meeting with any obstruction, as has been the case hitherto with tubular spools with a saw-cut at each side. The two inner walls also serve the purpose of engaging with a slotted key at one end, or with a tension device, friction-brake, or the like, or other mechanism that it may be desirable to connect therewith. The slotted key or other device is pushed onto the rib formed by the junction of the two walls, so that both will be rotated together.

The spool or reel A may be made with a flange C, as shown in Fig. 1, to prevent the penetration of light to the film when wound thereon, as shown in Fig. 1, or it may be made without such flange, the ends $b$ of the holder B serving for the same purpose as in Figs. 6, 8, and 12.

The spool or reel A is mounted to rotate in a holder B, made of sheet metal, with ends $b$ turned up at right angles to form the bearings for the spool or reel. The ends of the spool are passed through apertures made in the holder ends $b$, and these serve to hold together the two D-shaped pieces forming the spool-barrel. The ends of the spool may be expanded into the holes or apertures in the holder ends to retain them in position. The spool is preferably made a fairly tight fit in the apertures or bearings in the holder ends to bring sufficient friction to bear upon the rotating spool as to enable the ordinary friction-brake of the usual roll-holder to be dispensed with. The spool may, however, be permitted to rotate freely and a friction-brake be applied in the ordinary way.

The back of the metal holder is fluted or grooved with grooves $b'$ to stiffen or strengthen it, and the ends are made with similar grooves $b^2$, which engage with projections in the roll-holder or camera-box and serve as guides to direct the holder into its proper place or position therein. The end grooves $b'$ are placed in a different plane in the two ends to insure the holder always being fitted into the roll-holder or camera with the top end uppermost.

In Figs. 1, 2, 3, and 4 the spool A is shown with the flanges C.

In Figs. 6 and 7 the spool A is shown fitted into the holder B without flanges, the ends $b$ of the holder serving the same purpose.

In Figs. 8, 9, and 10 the spool A is shown fitted into the holder B without flanges, the ends $b$ being dished and the outer edges of the ends each being provided with a rim $b^3$ to strengthen or stiffen them.

In Fig. 11 a similar construction is shown to that described in Figs. 8 to 10, but without the rim or flange $b^3$.

It is to be understood that a flange similar to $b^3$ may be applied to either of the preceding forms of holder ends $b$.

In Figs. 12, 13, and 14 the holder B' for the spool is formed of the two longitudinal strips $b^4$ $b^5$, attached to the ends $b^6$.

What I claim as my invention, and desire to protect by Letters Patent, is—

1. A holder for photographic films comprising in its construction a reel of two D-shaped pieces of sheet metal, having the flat sides placed and secured together, in combination with a sheet-metal supporting-frame with ends provided with slots, into which the spool ends are fitted free to rotate therein, substantially as described.

2. A reel for photographic films comprising in its construction two D-shaped pieces of sheet metal with their flat sides placed face to face, and two end flanges by which they are secured together substantially as described.

3. In a holder for photographic films, the combination with a metallic frame or holder stamped from sheet metal, and provided with upturned ends of a sheet-metal reel provided with longitudinal slits and fitted into apertures in the ends of the holder, so as to rotate therein, substantially as described.

4. A photographic-film holder comprising in its construction, the holder B provided with stiffening-grooves, the upturned ends $b$ provided with apertures and stiffening-grooves, and the spool A formed of two D-shaped pieces of sheet metal, the ends $d$ of which are fitted into the aperture in the holder ends $b$ and provided with longitudinal slits D' between the two parts, substantially as described.

In witness whereof I have hereunto signed my name in the presence of two subscribing witnesses.

J. E. THORNTON.

Witnesses:
J. OWDEN O'BRIEN,
HARRY BARNFATHER.